May 30, 1961         J. B. PARSONS         2,986,044
THROTTLE AND REVERSE GEAR CONTROL FOR MARINE ENGINES
Filed Sept. 24, 1958         5 Sheets-Sheet 1

INVENTOR.
JOHN B. PARSONS
BY
Malcolm W. Fraser
ATTORNEY

May 30, 1961    J. B. PARSONS    2,986,044
THROTTLE AND REVERSE GEAR CONTROL FOR MARINE ENGINES
Filed Sept. 24, 1958    5 Sheets-Sheet 3

INVENTOR.
JOHN B. PARSONS
BY
*Malcolm W. Fraser*
ATTORNEY

INVENTOR.
JOHN B. PARSONS
BY
ATTORNEY

United States Patent Office 2,986,044
Patented May 30, 1961

2,986,044
THROTTLE AND REVERSE GEAR CONTROL FOR MARINE ENGINES
John B. Parsons, 1210 River Road, Maumee, Ohio
Filed Sept. 24, 1958, Ser. No. 762,996
13 Claims. (Cl. 74—472)

This invention relates to the operation of marine engines as used on power operated craft embodying inboard or outboard engines.

An object is to produce a control mechanism by which the pilot may by a single manual lever operate the clutch and throttle so that the speed and direction of drive can be readily controlled, thereby to simplify the operation of the craft and facilitate its maneuverability.

Another object is to produce a combined throttle and reverse gear control mechanism by which the same are conjointly operated or alternatively the throttle may be operated independently of the reverse gear mechanism, provision being made to permit the latter operation only when the reverse gear mechanism is in its neutral position. Thus the engine may be accelerated at the start for warming up purposes without liability of the craft being driven.

Other objects and advantages of the invention will hereinafter appear and for purposes of illustration, but not of limitation, embodiments of the invention are shown on the accompanying drawings, in which.

Figure 1:
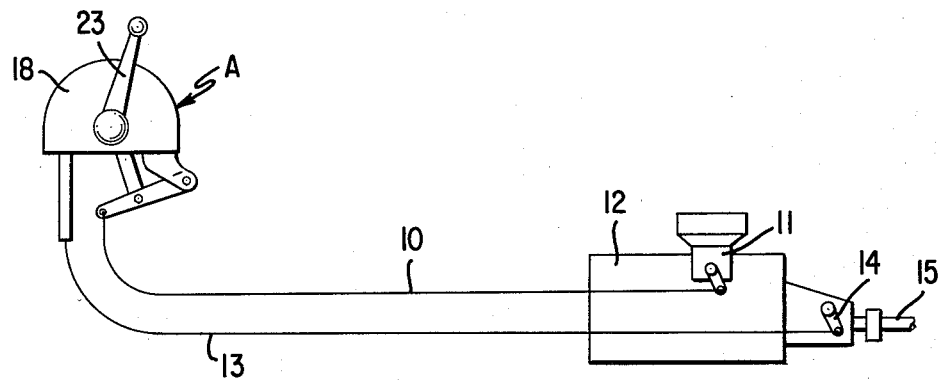
Figure 1 is a diagrammatic view showing control mechanism connected to a marine engine throttle and reverse gear.

The illustrated embodiment of the invention as diagrammatically illustrated on Figure 1 constitutes a throttle and reverse gear control unit A for use as in Figure 1 with an inboard marine engine for operating the engine throttle and also operating the reverse gear mechanism. In Figure 1 it will be noted that leading from the unit A is a push-pull cable 10 which extends to the carburetor 11 for actuating the throttle thereof and thus regulating the fuel supply to the engine. Also leading from the unit A is another push-pull cable 13 which extends to a lever 14 directly operating the reverse gear mechanism, thereby to drive the propeller shaft 15 in one direction or the other as will be readily understood. As will hereinafter appear, manual actuation of the lever forming a part of the unit A effects a predetermined actuation of the throttle lever and the reverse gear lever so that by means of a single operating arm, the engine speed is controlled and the engine is operated for either neutral, forward or reverse operation.

Figure 2:
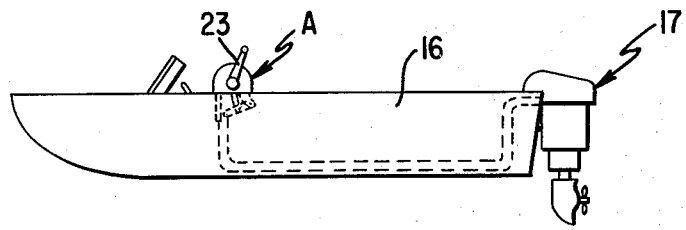
Figure 2 is a diagrammatic view showing a boat having an outboard motor to which the control mechanism is operatively connected.

Figure 2 shows the unit A in a boat 16 equipped with an outboard motor 17. As indicated by the broken lines, push-pull cables lead from the unit A to the outboard motor for respectively actuating the throttle thereof and the arm or mechanism (not shown) which places the motor in neutral, forward or reverse operation.

The throttle and reverse control unit A comprises a dome-shaped housing 18 which has a closed top, parallel side and end walls, the bottom of the housing being open. Depending from the housing are stud bolts 19 for enabling the unit to be secured in a desired position on the boat. As indicated at 20 in Figures 5 and 6, one side wall of the housing has the lower portion thereof of increased thickness and such portion is formed with an integral, inwardly extending bearing sleeve 21, there being an opening in the side wall registering with this sleeve to receive an elongate hub 22 which is rotatable and axially slidable therein. On the outside of the housing and integral with the hub 22 is an integral operating arm 23, the upper end of which inclines inwardly and has an operating knob 24 on the free end thereof to be grasped by the operator for actuation of the arm.

Figure 5:
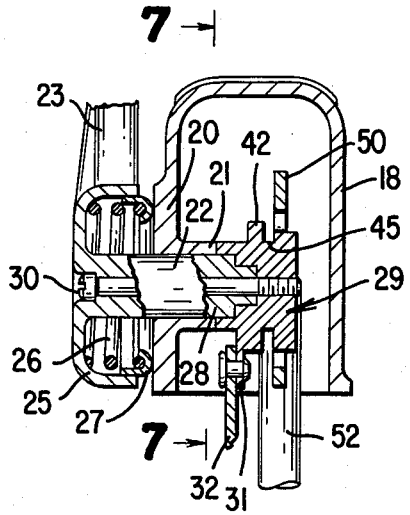
Figure 5 is a fragmentary sectional view on the line 5—5 of Figure 3 showing the parts in position for operating both the throttle and reverse mechanism.
Figure 6:
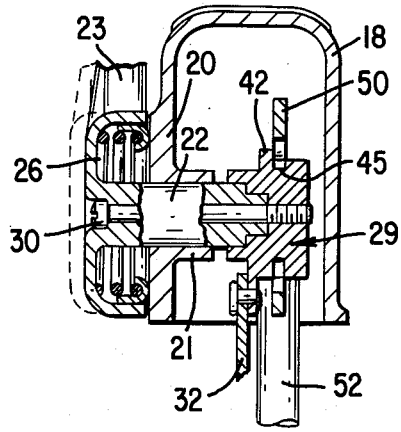
Figure 6 is a fragmentary sectional view similar to Figure 5 but showing the operating arm pushed inwardly resulting in operation of throttle only.

At the inner end of the arm adjacent the housing is a circular cup-shaped enlargement 25 which is closed at the outer side but open at the inner side, particularly as shown on Figures 5 and 6. Within the enlargement 25 is a helical coil spring 26 which bears at one end against the inside of the cup enlargement 25, the inner end of the spring bearing against an annular spring retainer 27 which has a curved end portion abutting against the adjacent flat surface of the housing wall portion 20. Formed on the spring retainer 27 and the wall portion of the housing 20 against which the retainer abuts may be detents for indicating to the operator when the arm is disposed in its neutral position as will hereinafter be described more fully.

The portion of the hub which extends beyond the inner end of the housing bearing sleeve 21 is of stepped formation as indicated at 28 and fitting over this exposed end portion and abutting against the adjacent end of the sleeve 21 is a cam member 29 which is socketed to conform to the stepped formation 28. Extending through the hub 21 from the outside of the circular cup portion 25 of the operating arm and through the cam member 29 is a screw 30 for securing these parts together for conjoint movement.

On the side of the cam member toward the arm 23 is a depending flange 31 to which one end of a link 32 is pivoted. The link 32 hangs downwardly, as indicated on Figure 3, and is pivoted to an intermediate portion of a lever arm 33. One end of the arm 33 is pivoted to a bracket arm secured to the housing 18 and depending therefrom, the pivotal connection being indicated at 35. The free end portion of the arm 33 fits in the bifurcated end 38 of a fitting 37, there being a pin 36 which extends beyond both sides of the arm 33 and enters vertically elongate slots 39 in the fitting. The fitting 37 has a socket in which is disposed a helical coil spring 40 seating at one end against the bottom of the socket and at the other end against an abutment plate 41 which presses against the adjacent under edge portion of the arm 33. The push-pull cable 10 is suitably secured to the lower end of the fitting 37 and when the cam member 29 is rotated by operation of the manual arm 23, the lever arm 33 is raised or lowered by the link 32.

The cam member 29 comprises an inner circular portion 42 disposed on the side toward the control arm 23 and an outer cam portion 43. The outer cam portion 43 has a semi-circular periphery 44 of the same diameter as the circular portion 42 and between the inner circular portion 42 and the outer cam portion 43 is an annular groove 45. The cam portion 43 is slightly larger than a semi-circle and has a cam surface 46 on the inside or generally transverse of the axis. The cam surface 46 as particularly shown on Figures 7 to 11 has an outwardly curved or humped center portion 47 and straight reversely inclined cam-like end portions 48. Between the portions 47 and 48 are intermediate cam portions 49 which are relatively straight, each inclining inwardly from the adjacent end portions 48 in a direction toward the axis of the cam member.

Figure 7:
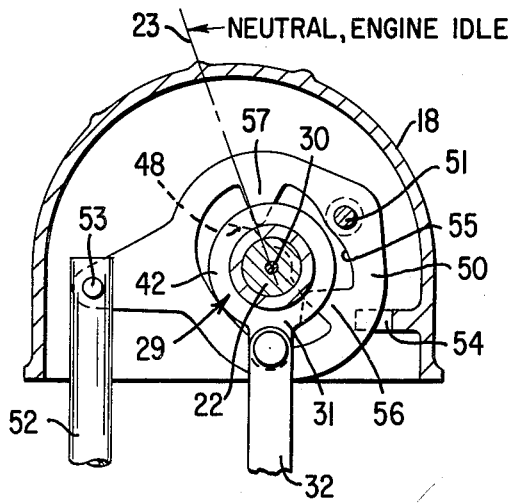
Figure 7 is a sectional view on the line 7—7 of Figure 5.

A reverse gear actuating arm 50 has a substantially circular body and rocks on a pivot pin 51 carried by the housing and disposed at one side of the axis of the cam member and associated parts, the arm on the opposite side of the cam member having an extension which is pivotally connected to a depending operating tube 52. The tube 52 extends through the open lower end of the housing and depends a substantial distance therebelow, the tube 52 being connected to the arm by a pivot pin 53. Although the arm 50 can have a limited amount of lateral flexure for a purpose hereinafter described, it is generally held in place and guided by a fork 54 integral with the housing and projecting inwardly therefrom (Figure 7).

The circular body of the operating arm 50 has an opening 55 of a size to permit the cam member to pass axially through for a purpose hereinafter to be described. Extending generally radially from the edge of the opening 55 is a pair of cam followers 56 and 57 which are tooth-like and somewhat cone-shaped, having a pointed inner end and a wider base portion which is integral with the arm 50. The followers 56 and 57 are not diametrically opposed to each other but are inclined generally toward each other and are so arranged as to engage the cam surface 46 at different portions so that upon oscillation of the cam member, the cam surface 46 imparts the desired rocking or shifting movement to the operating arm for actuating the reverse gear mechanism through the tube 52 and push-pull wire for shifting the same to neutral, forward and reverse positions as will hereinafter appear.

Figure 3:
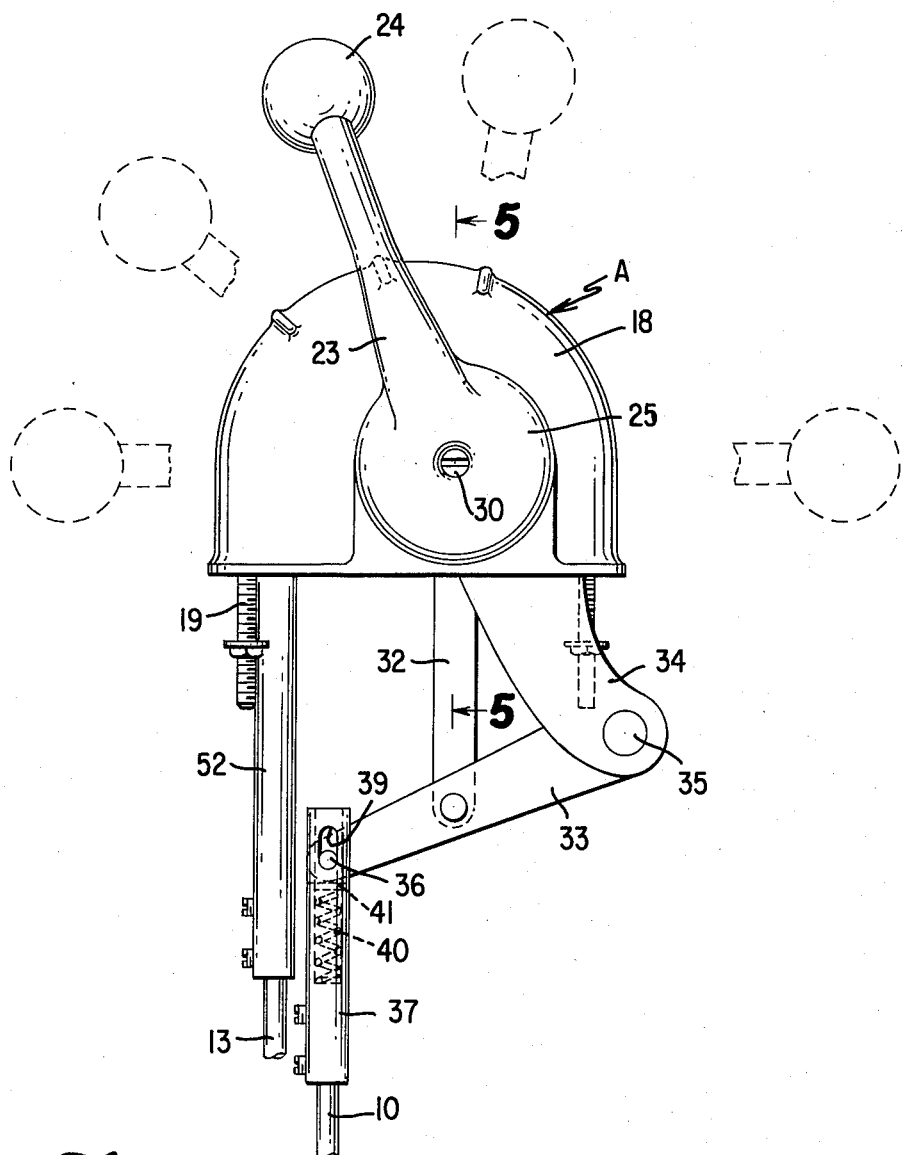
Figure 3 is a side elevation of the combined throttle and reverse gear control mechanism.
Figure 4:
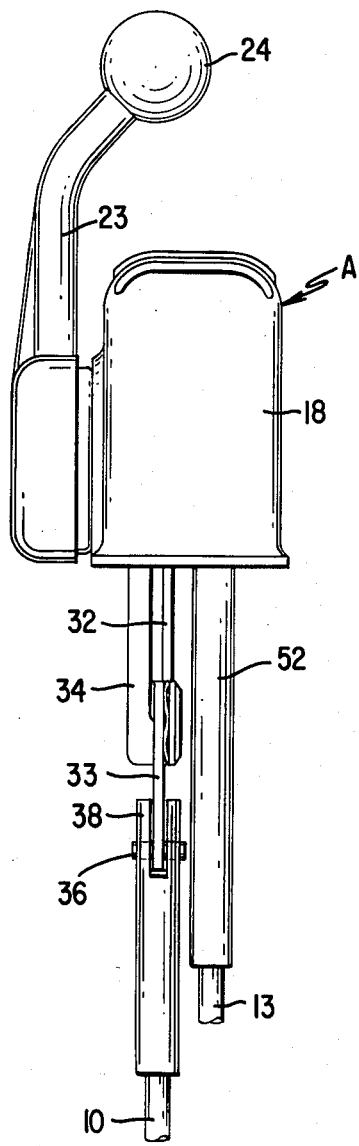
Figure 4 is an end elevation of the mechanism shown in Figure 3.

In operation it will be observed in Figure 7 that the operating arm 23 which is indicated by a broken line is disposed in its neutral position and in such position the cam followers 56 and 57 are disposed at the inner edge of each of the straight end portions 48 of the cam surface or profile 46 and in such position for a purpose hereinafter appearing, these cam followers are free of the periphery of the inner circular portion of the cam member. This position of the operating arm 50 is such as to dispose the reverse gear mechanism for the engine in its neutral position. The operating arm 23 shown in Figure 3 is in such neutral position. Additionally it will be observed that the throttle operating link 32 is in its substantially straight up and down position, in which position the throttle is a engine idling position.

Figure 8:
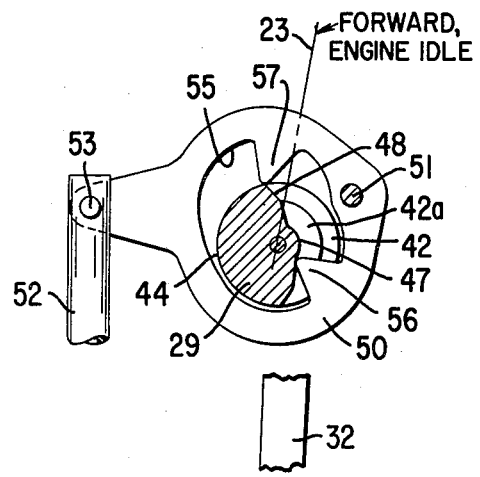
Figures 8 to 11 are diagrammatic views showing the throttle and reverse gear operating parts in different positions of adjustment.

My moving the operating arm 23 forwardly to the position shown in Figure 8, a clockwise movement is imparted to the cam member and due to the slots 39 in the operating tube 37, it will be manifest that the arm 33 can move upwardly (Figure 3) without imparting any movement through the push-pull wire 10 to the throttle so that the engine is still idling. However such movement of the cam member has imparted a clockwise movement to the reverse gear operating arm 50 by the camming action of the upper straight cam end portion 48 operating against the cam follower 57, the cam follower 56 moving along the lower of the intermediate cam portions 49. Thus it is apparent that a forward movement of the main operating arm 23 to the position shown in Figure 8 serves to actuate the reverse gear mechanism to its forward operating position but without increasing the engine speed.

Figure 9:
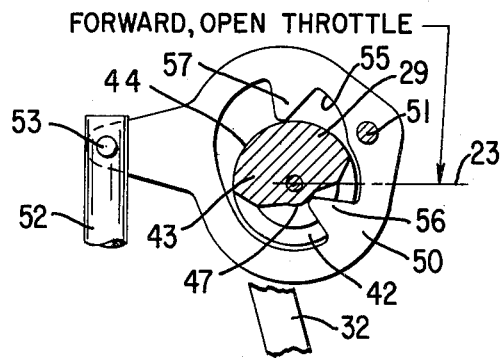

Referring now to Figure 9, the main operating arm 23 has been moved farther forwardly in a clockwise direction, the upper cam follower 57 riding along the arcuate periphery 44 of the cam member and the lower cam follower 56 riding over the curved or humped center portion 47 of the cam profile. Thus the arm 50 remains in the same position as it was in Figure 8 but the link 32 which operates the throttle has been moved upwardly and imparts a clockwise movement to the arm 33 (Figure 3) and lifts the fitting 37 and its push-pull wire 10 and this pull opens the throttle, this figure showing the throttle in its open position. Manifestly there are several positions between that shown in Figure 8 and Figure 9 which can be selected, depending upon the engine speed desired.

Figure 10:
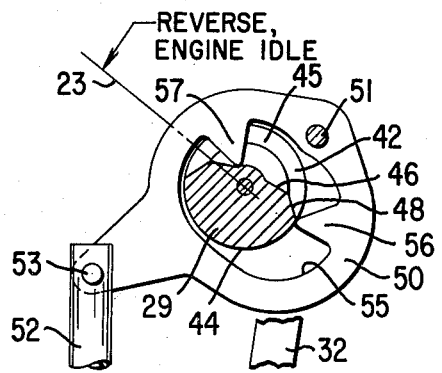
Figure 11:
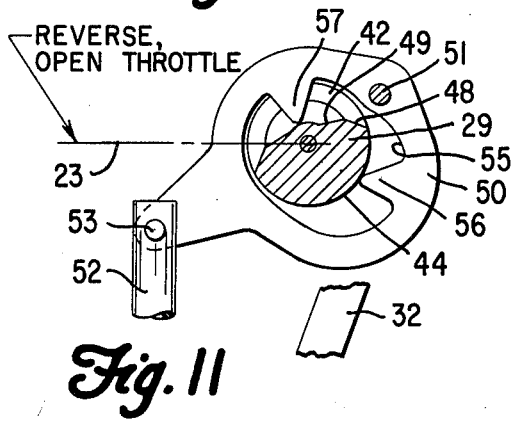

Referring to Figure 10, the main operaing arm 23 has been moved from the position shown in Figure 7 or the neutral position, in a counterclockwise direction, to move the arm 50 downwardly or to such position as to shift the reverse gear mechanism to its reverse position. It will be seen that the arm 50 is moved downwardly, thereby moving downwardly the tube 52 which connects to the push-pull wire 13. This is achieved by movement of the cam member in a counterclockwise direction to cause the follower 57 to move along the adjacent intermediate cam portion 49 adjacent thereto, the cam follower 56 riding along the adjacent outer or terminal end portion 48 of the cam. At the same time of course the depending flange 31 on the cam member has moved upwardly to cause the arm 33 to move upwardly. However the elongate slot 39 again enables such movement without imparting movement to the fitting 37 and the push-pull wire 10 leading to the throttle lever so that the engine remains at idling speed.

From further movement of the main operating arm 23 from the position shown in Figure 8 to the position shown in Figure 9, it will be manifest that the reverse gear mechanism stays in its reverse operating position since no further movement is imparted to the arm 50 but this movement is such as to pull on the link 32 and lift the arm 33, thereby to impart further opening movement to the throttle, Figure 9 showing the throttle in its open position.

It should be manifest that movement of the cam member in one direction or the other from the dead center position is such as to compress the coil spring 40 in the fitting 37, thus the coil spring enables movement of the link 32 over the dead center position without imparting strain on the connections which otherwise might result in damage or breakage.

An important feature resides in enabling speeding up of the engine while the reverse gear is in its neutral position. The structure is such that it is not possible to speed up the engine for warming up purposes, for example, unless and until the reverse gear mechanism is in its neutral position. By referring to Figure 7, it will be observed that the cam followers 56 and 57 are free of the inner circular portion 42a of the cam member which is of less diameter than the inner circular portion 42. Thus in the neutral position of the cam member and the arm 50, the cam followers 56 and 57 are in such position as not to be blocked by the semi-circular portion 42a. Therefore it is possible when in this position for the hub of the main operating arm 23 to be pushed in axially against the force of the spring 26, thereby to move the cam followers 56 and 57 into the annular groove 45 and by a slight turn of the control arm 23 the cam followers are restrained by the groove 45 and the cam member and associated parts can be oscillated relatively to the arm 50. So long as the cam followers are disposed in the groove 45, the speed of the engine can be accelerated inasmuch as the link 32 and arm 33 can be actuated independently of the reverse gear operating arm 50. As above mentioned, this enables the engine to be accelerated and warmed up prior to operating the boat. However as soon as the arm 23 is returned to its neutral position, the coil spring 26 abruptly moves the hub 22 and the operating arm 23 and associated parts to normal position and the cam followers are again in position to be actuated by contact with the cam profile as above described.

Figure 12:
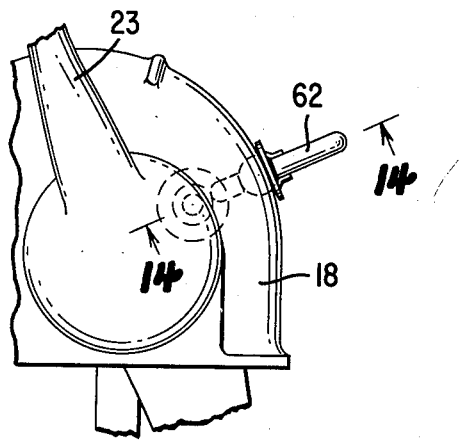
Figure 12 is a fragmentary side elevation of an alternate form of throttle and reverse gear control mechanism employing a separate manually operated flip member for shifting the parts to and from reverse gear operating position.
Figure 13:
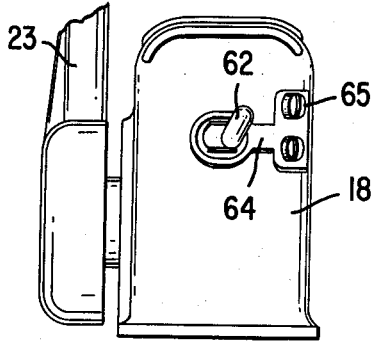
Figure 13 is an end elevation of the device shown in Figure 12.
Figure 14:
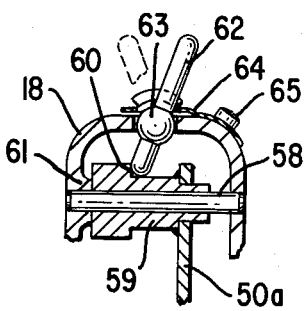
Figure 14 is a sectional view on the line 14—14 of Figure 12.

Figures 12 to 14 show an alternate form of actuation for the parts to enable the speed of the engine to be regulated for warming up purposes independently of the operation of the reverse gear. In this form there is a transverse pivot pin 58 which connects the parallel walls of the housing 18 and 50a represents the reverse gear operating arm corresponding to the arm 50 above described. Shiftable axially on the pivot pin 58 about which the arm 50a rocks is a slide member 59 which is secured as by welding to the adjacent end portion of the arm 50a. The slide 59 has an enlarged head at the inner end providing a shoulder 60. On the inner wall of the housing adjacent the free end of the head is an abutment 61 against which the slide may rest. There is a hole in the housing through which a flip lever 62 extends to engage the shoulder 60 when in one position and in the other position may engage the adjacent end portion of the arm 50a, thereby to enable shifting of the slide 59 in one direction or the other for positioning the arm either in its operative cam engaging position or in such position that the cam followers ride in the groove as above mentioned to enable opening of the throttle without disturbing the neutral position of the reverse gear operating arm. The flip lever 62 has a sphere-like portion 63 which is mounted in a spring plate 64 secured by screws 65 to the outside of the housing. The spring plate 64 is provided with substantially parallel spring guide elements for holding the lever in one or the other position of adjustment. It will be understood that in this form as in the form previously described, the reverse gear must be in its neutral operating position before it is possible to shift the reverse gear operating arm to the position where the main operating arm 23 can be rocked for opening the engine throttle.

Figure 15:
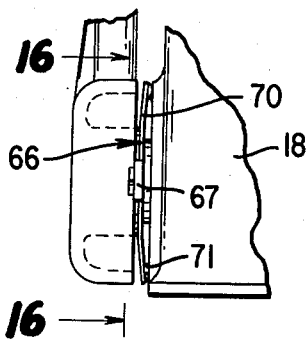
Figure 15 is an enlarged detail fragmentary view of an alternate form showing a spring and detent between the housing and control arm.
Figure 16:
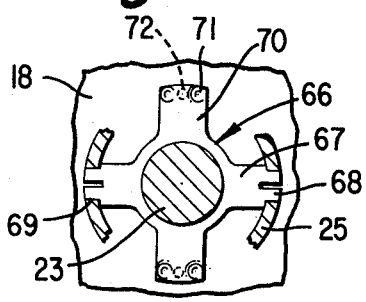
Figure 16 is a sectional view substantially on the line 16—16 of Figure 15.

Since it is desirable to indicate to the operator that the reverse gear is in either its neutral, forward or reverse positions, this may be achieved by detent means such as indicated on Figures 15 and 16 wherein a sheet metal cross-shaped spring 66 is shown fitting the hub 23. This spring has diametrically opposed arms 67 formed with terminal spring fingers 68 which are shouldered to extend into holes 69 in the circular enlargement 25 of the hub of the operating arm. At right angles to the spring arm 67 are diametrically opposed arms 70 which have spaced nubbins 71 on the free end which serve as detents and engage therebetween nubbins 72 on the housing 18. Thus in either direction of turning of the control arm, movement over these nubbins will indicate the movement of the arm out of its neutral position. Likewise the return to neutral position will be indicated by this movement.

Numerous changes in details of construction, arrangement and choice of materials may be effected without departing from the spirit of the invention, especially as defined in the appended claims.

What I claim is:

1. A throttle and reverse gear control for marine engines comprising an operating member oscillatable and shiftable about a common axis, an operative connection from said member for throttle actuation for opening and closing the throttle in response to oscillation of said operating member, a shiftable member having an operative connection with the reverse gear, an operative connection between said shiftable member and said oscillatable operating member for effecting predetermined movement of said shiftable member from oscillation of said operating member, said last operative connection comprising profiled cam means for placing the reverse gear selectively into forward, neutral and reverse positions in response to predetermined movement of said operating member, and means for effecting relative axial movement between said oscillatable operating member and said shiftable member for rendering ineffective the operative connection therebetween, thereby to enable oscillation of said operating member for throttle operation independently of reverse gear operation.

2. A throttle and reverse gear control for marine engines comprising an operating member oscillatable and shiftable about a common axis, an operative connection from said member for throttle actuation for opening and closing the throttle in response to oscillation of said operating member, a shiftable member having an operative connection with the reverse gear, said shiftable member being apertured and having cam follower means, an operative connection between said shiftable member and said oscillatable operating member for effecting predetermined movement of said shiftable member from oscillation of said operating member, said last operative connection comprising a cam movable with said operating member and disposed in the aperture of said shiftable member for engagement by said cam follower means, and means for effecting relative axial movement between said oscillatable operating member and said shiftable member for rendering ineffective the operative connection therebetween, thereby to enable oscillation of said operating member for throttle operation independently of reverse gear operation.

3. A throttle and reverse gear control for marine engines comprising an operating member oscillatable and shiftable about a common axis, an operative connection from said member for throttle actuation for opening and closing the throttle in response to oscillation of said operating member, a shiftable member having an operative connection with the reverse gear, said shiftable member being apertured and having cam follower means, an operative connection between said shiftable member and said oscillatable operating member for effecting predetermined movement of said shiftable member from oscillation of said operating member, said last operative connection comprising a cam movable with said operating member and disposed in the aperture of said shiftable member for engagement by said cam follower means, means for effecting relative axial movement between said oscillatable operating member and said shiftable member for effecting disengagement of the cam follower means and cam for enabling oscillation of the operating member for throttle operation only.

4. A throttle and reverse gear control for marine engines comprising an operating member oscillatable and shiftable about a common axis, an operative connection from said member for throttle actuation for opening and closing the throttle in response to oscillation of said operating member, a shiftable member having an operative connection with the reverse gear, said shiftable member being apertured and having cam follower means, an operative connection between said shiftable member and said oscillatable operating member for effecting predetermined movement of said shiftable member from oscillation of said operating member, said last operative connection comprising a cam movable with said operating member and disposed in the aperture of said shiftable member for engagement by said cam follower means, means for effecting relative axial movement between said oscillatable operating member and said shiftable member for effecting disengagement of the cam follower means and cam for enabling oscillation of the operating member for throttle operation only, and means for blocking such relative movement between said operating and oscillatable member except when the shiftable member is in such position as to require the reverse gear to be in neutral position.

5. A throttle and reverse control for marine engines comprising an operating member mounted for oscillating and axial movements about a common axis, an operative connection from said member for opening and closing the throttle in response to oscillating movements of said operating member, a shiftable member having an operative connection with the reverse gear for actuating the latter to establish forward, neutral and reverse operation, an operative connection between said shiftable and operating members for effecting predetermined movement of the shiftable member from oscillation of said operating member, and means for rendering ineffective said last operative connection upon axial movement of said operating member, thereby to enable oscillation of said operating member for throttle operation solely.

6. A throttle and reverse control for marine engines comprising an operating member mounted for oscillating and axial movements about a common axis, an operative connection from said member for opening and closing the throttle in response to oscillating movements of said operating member, a shiftable member having an operative connection with the reverse gear for actuating the latter to establish forward, neutral and reverse operation, an operative connection between said shiftable and operative members for effecting predetermined movement of the shiftable member from oscillation of said operating member, means for rendering ineffective said last operative connection upon axial movement of said operating member, thereby to enable oscillation of said operating member for throttle operation solely, and means for militating against axial movement of said operating member unless said shiftable member is so positioned as to cause the reverse gear to be in neutral position.

7. A throttle and reverse control for marine engines comprising an operating member mounted for oscillating and axial movements about a common axis, an operative connection from said member for opening and closing the throttle in response to oscillating movements of said operating member, a pivotal member having an operative connection with the reverse gear for actuating the latter to establish forward, neutral and reverse operation, an operative connection between said pivotal and operating members for effecting predetermined movement of the pivotal member from oscillation of said operating member, means for rendering ineffective said last operative connection upon axial movement of said operating member, thereby to enable oscillation of said operating member for throttle operation solely, and means for militating against axial movement of said operating member unless said pivotal member is so positioned as to cause the reverse gear to be in neutral position.

8. A throttle and reverse control for marine engines comprising an operating member mounted for oscillating and axial movements about a common axis, an operative connection from said member for opening and closing the throttle in response to oscillating movements of said operating member, a pivotal member having an operative connection with the reverse gear for actuating the latter to establish forward, neutral and reverse operation, an operative connection between said pivotal and operating members for effecting predetermined movement of the pivotal member from oscillation of said operating member, said pivotal member being apertured and having cam follower means extending into such aperture, and said last operative connection comprising a cam on the operating member against which the cam follower means engage, means for rendering ineffective said last operative connection upon axial movement of said operating member, thereby to enable oscillation of said operating member for throttle operation solely, and means for militating against axial movement of said operating member unless said pivotal member is so positioned as to cause the reverse gear to be in neutral position.

9. A throttle and reverse control for marine engines comprising an operating member mounted for oscillating and axial movements about a common axis, an operative connection from said member for opening and closing the throttle in response to oscillating movements of said operating member, a shiftable member having an operative connection with the reverse gear for actuating the latter to establish forward, neutral and reverse operation, an operative connection between said shiftable and operating members for effecting predetermined movement of the shiftable member from oscillation of said operating member, means for rendering ineffective said last operative connection upon axial movement of said operating member, thereby to enable oscillation of said operating member for throttle operation solely, means for militating against axial movement of said operating member unless said shiftable member is so positioned as to cause the reverse gear to be in neutral position, and spring means for tensioning said operating means and disposing same axially in position for conjoint throttle and reverse gear operation.

10. A throttle and reverse gear control for marine engines comprising an operating member mounted for oscillating and axial movements about a common axis, an operative connection from said member for throttle actuation for opening and closing the throttle in response to oscillation of said operating member, a shiftable member having an operative connection with the reverse gear, said shiftable member being apertured and having cam follower means, an operative connection between said shiftable member and said oscillatable operating member for effecting predetermined movement of said shiftable member from oscillation of said operating member, said last operative connection comprising a cam movable with said operating member and disposed in the aperture of said shiftable member for engagement by said cam follower means, and means responsive to axial movement of said operating member for moving said shiftable member for effecting disengagement of the cam follower means and cam for enabling oscillation of the operating member for throttle operation only.

11. A throttle and reverse control for marine engines comprising an operating member mounted for oscillating and axial movements about a common axis, an operative connection from said member for opening and closing the throttle in response to oscillating movements of said operating member, a shiftable member having an operative connection with the reverse gear for actuating the latter to establish forward, neutral and reverse operation, an operative connection between said shiftable and operating members for effecting predetermined movement of the shiftable member from oscillation of said operating member, means for rendering ineffective said last operative connection upon axial movement of said operating member, thereby to enable oscillation of said operating member for throttle operation solely, means for militating against axial movement of said operating member unless said shiftable member is so positioned as to cause the reverse gear to be in neutral position, spring means for tensioning said operating member and disposing same axially in position for conjoint throttle and reverse gear operation, and detent means associated with said operating member for designating to the operator the neutral position of the reverse gear.

12. A throttle and transmission control for engine driven power units comprising an axially mounted operating member, means mounting said operating member for oscillation about its mounting axis, a throttle actuating member, means operatively connecting said operating member with said throttle actuating member whereby oscillation of said operating member about said axis will cause movement of said throttle actuating member, a transmission control member disposed in operative relationship with said operating member, means carried by said operating member for operatively engaging said transmission control member whereby the latter is moved in response to oscillation of said operating member about said axis, means permitting movement of said operating member along said axis thereby to disengage said operating member from said transmission control member and permit movement of said throttle actuating member without movement of said transmission control member.

13. A throttle and transmission control for engine driven power units comprising an axially mounted operating member, means mounting said operating member for oscillation about its mounting axis, a throttle actuating member, means operatively connecting said operating member with said throttle actuating member whereby oscillation of said operating member about said axis will cause movement of said throttle actuating member, a transmission control member disposed in operative relationship with said operating member, means carried by said operating member for operatively engaging said transmission control member whereby the latter is moved in response to oscillation of said operating member about said axis, means permitting movement of said operating member along said axis thereby to disengage said operating member from said transmission control member and permit movement of said throttle actuating member without movement of said transmission control member, and yieldable means constantly urging axial movement of said operating member toward transmission control member engaging position.

References Cited in the file of this patent

UNITED STATES PATENTS

| | | |
|---|---|---|
| 2,552,001 | Dougas | May 8, 1951 |
| 2,759,578 | Manzolillo | Aug. 21, 1956 |
| 2,804,782 | Erxleben | Sept. 3, 1957 |